Feb. 21, 1950
F. GAVIOLA ET AL
2,498,160
POWER OPERATED SAW
Filed May 3, 1946
2 Sheets-Sheet 2
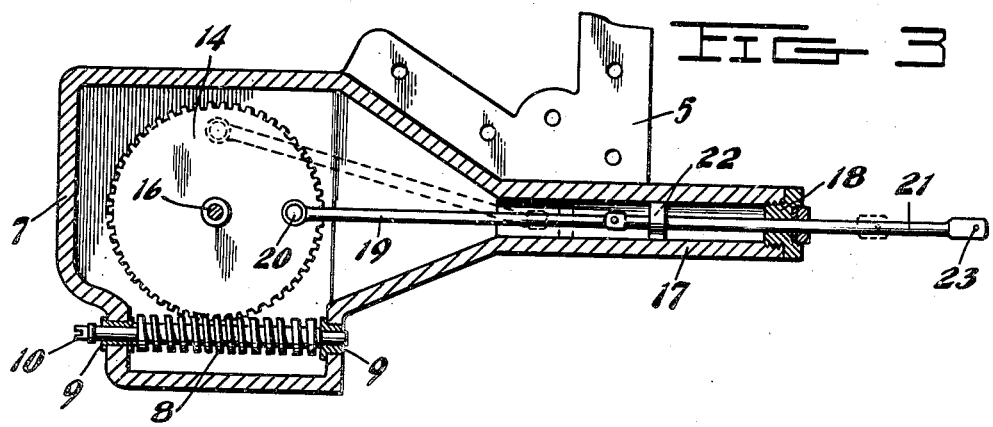
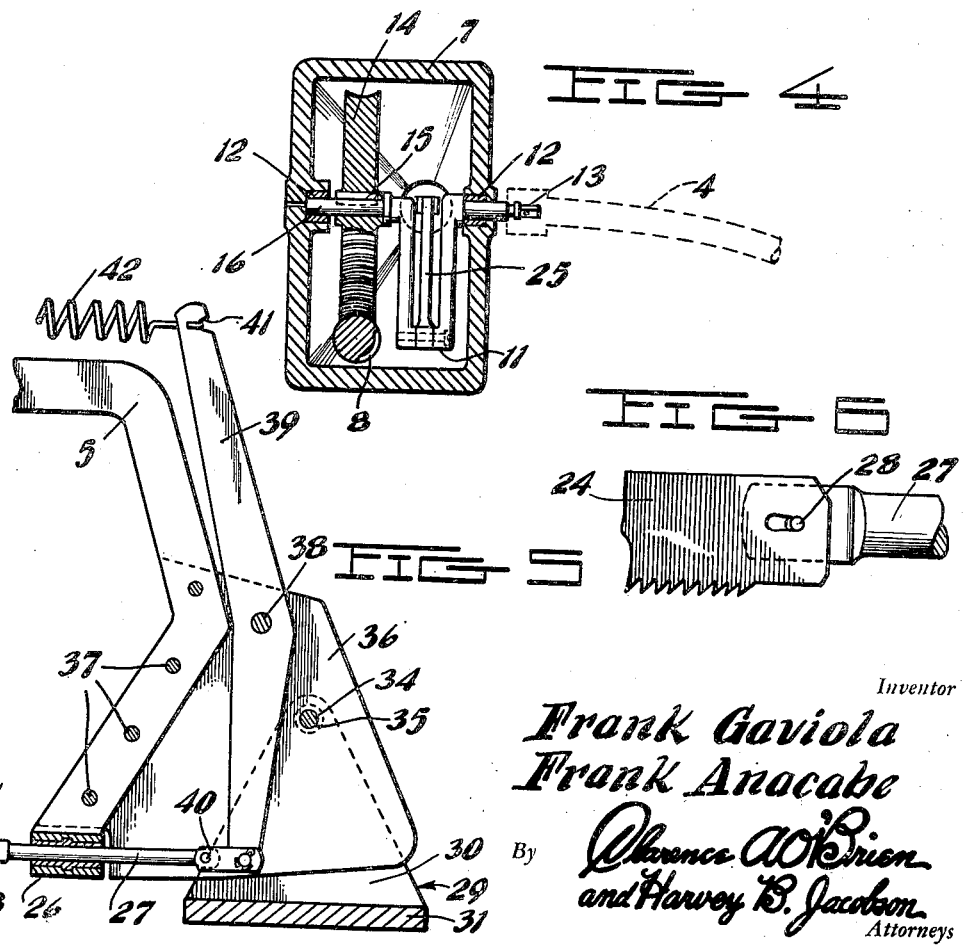
Inventor
Frank Gaviola
Frank Anacabe
By Clarence A. O'Brien
and Harvey B. Jacobson
Attorneys Patented Feb. 21, 1950

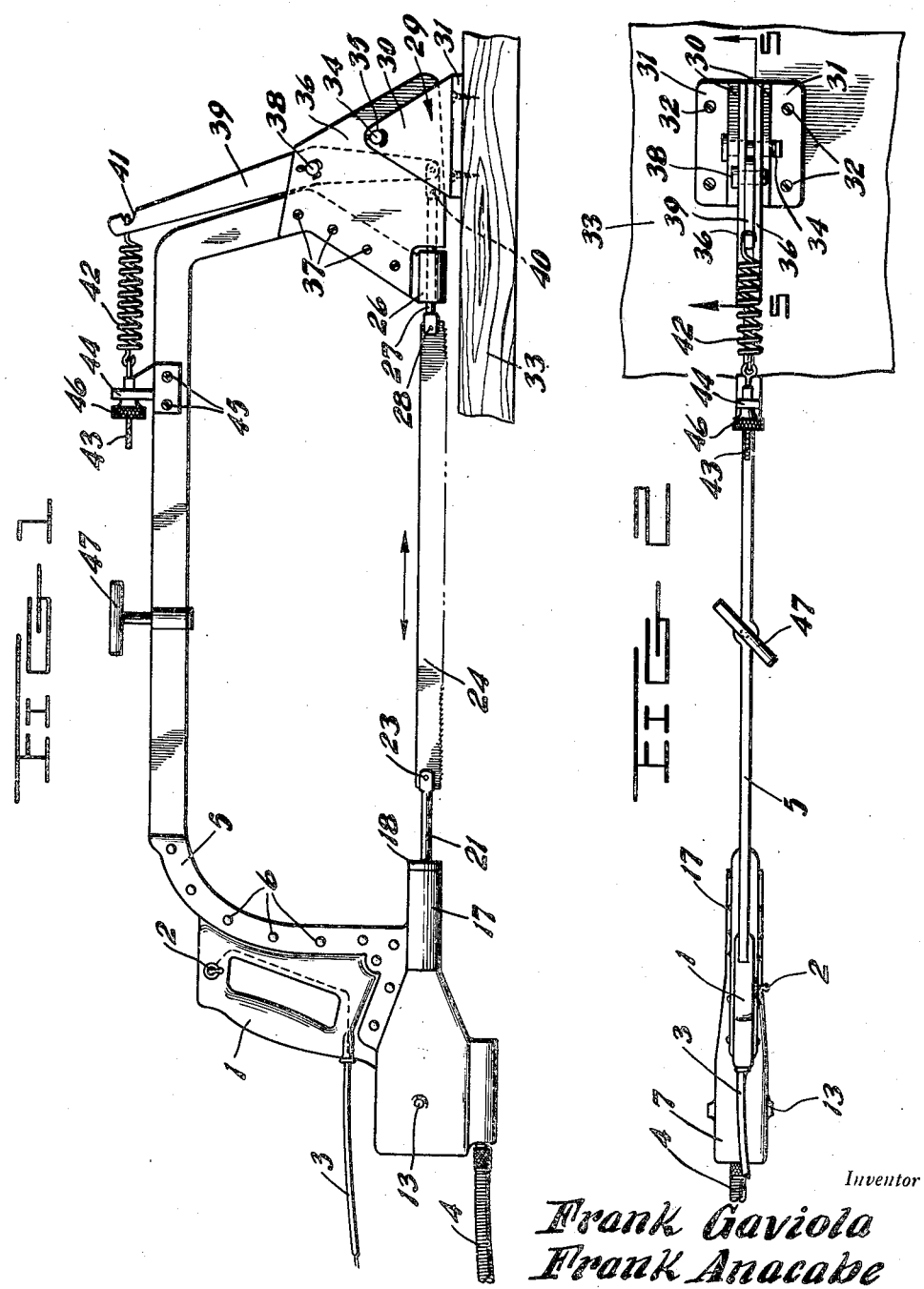

2,498,160

UNITED STATES PATENT OFFICE 2,498,160

POWER-OPERATED SAW

Frank Gaviola and Frank Anacabe, Elko, Nev.

Application May 3, 1946, Serial No. 666,967

1 Claim. (Cl. 29—73)

This invention relates to improvements in power operated saws.

An object of the invention is to provide an improved power operated saw including a handle portion with attached inverted U-shaped frame having a saw blade reciprocably mounted between the ends thereof, and means for reciprocating the saw blade.

Another object of the invention is to provide an improved power operated saw including a handle portion with attached inverted U-shaped frame having a saw blade reciprocably mounted between the ends thereof, together with means for reciprocating the saw blade, and a supporting bracket whereby said saw may be pivotally supported thereon when in operation, or may be removed from the bracket when used as a portable saw.

A further object of the invention is to provide an improved power operated saw including a handle portion with attached inverted U-shape frame having means for reciprocating a saw blade supporting member at one end of said frame and a pivoted saw supporting arm or lever at the opposite end of said frame, with a saw blade connected between said blade supporting means.

Another object of the invention is to provide an improved power operated saw including a handle portion with attached inverted U-shape frame formed with a variable speed crank mechanism for reciprocating a saw blade supporting rod at one end of said frame, and a variably tensioned pivoted arm having a reciprocating saw blade supporting rod linked thereto, together with a saw blade connected between said saw blade supporting rods, and means for operating said crank mechanism.

Other objects will appear as the description proceeds.

In the accompanying drawings which form a part of this application,

Figure 1 is a side elevation of the improved power operated saw;

Figure 2 is a plan view looking down on the improved power operated saw;

Figure 3 is a longitudinal sectional view through the variable speed crank mechanism for reciprocating the saw blade;

Figure 4 is a transverse sectional view through the variable speed crank mechanism for reciprocating the saw blade showing a modified form of mechanism;

Figure 5 is an enlarged detail view partly in section of the pivotally mounted oscillating saw blade supporting mechanism, and Figure 6 is an enlarged detail view of one end of a saw blade showing the same attached to its supporting rod.

Like characters of reference are used throughout the following specification and the accompanying drawings to designate corresponding parts.

In carrying out the invention, there is provided an improved power operated saw including a handle portion generally denoted by the reference numeral 1 adapted to support the electric switch 2 with attached electric conductor cable 3 extending through the said handle and adapted to be connected in series with an electric motor (not shown) and a source of electric current supply, said motor having a flexible driving shaft 4 connected with its shaft adapted to be connected with the crank mechanism for reciprocating the saw blade, later to be described.

An inverted U-shape metal saw frame 5 is adapted to be secured at one end to the handle 1 by means of the rivets or fasteners 6, and supports the integral depending longitudinally extending casing or housing 7 in which the saw blade reciprocating mechanism is housed. The worm gear 8 is mounted in the bearings 9 longitudinally of the casing or housing 7, and is formed with the rearwardly extending forked connection end 10 for receiving the free end of the flexible driving shaft 4 operated by the electric motor (not shown).

A crank 11 is mounted transversely in the casing or housing 7 in the bearings 12, one end thereof being provided with an attaching end 13 for alternate connection with the flexible driving shaft 4. The gear 14 is keyed at 15 to the crank shaft 16 and is meshed with the worm gear 8 to be driven thereby when rotated by the electric motor and flexible shaft 4 attached thereto.

The guide tube or bearing 17 is formed integrally with the casing or housing 7 and is provided with a threaded apertured packing gland or bushing 18 in its outer end. A connecting rod 19 will be eccentrically mounted on the gear 14 at 20, and will extend into said bearing 17, and will be pivotally connected with the saw blade supporting rod 21 extending through the bushing 18. A bearing block guide 22 will be disposed upon the blade supporting rod 21 to slide back and forth in the said tube or bearing 17. The usual pin 23 will be formed on the outer end of the rod 21 over which the apertured or slotted end of the saw blade 24 will be placed.

An alternate form of saw blade reciprocating means is shown in Figure 4 of the drawings, and includes a connecting rod 25 attached to the crank 11, said rod being pivotally connected to the saw blade supporting rod 21 in place of the connecting rod 19 shown in Figure 3 of the drawings.

The opposite end of the saw frame 5 will be extended inwardly at its lower end, and will integrally support the guide tube or bearing member 26, which is apertured to reciprocably receive the saw blade supporting rod 27 formed with the usual pin 28 for attaching and supporting the adjacent end of the saw blade 24.

A supporting bracket 29 is formed with spaced upstanding ears 30 and with the oppositely disposed attaching flanges 31 through which the screws or fasteners 32 will extend to secure the same to a support or bench 33. A cross pivot pin 34 will be disposed in the aligned apertures 35 in the upper ends of the ears 30, to pivotally support the guard plates 36 secured to the opposite sides of the saw frame 5 by means of the rivets or fasteners 37 to pivotally mount the saw frame and to prevent any foreign article from being accidentally inserted between the lower ends of the saw frame 5 and the associated movable operating mechanism.

A pin 38 will be disposed between the guard plates 36 and will pivotally support the bell crank operating lever 39, the lower end of which is connected by means of the link 40 to the end of the saw blade supporting rod 27. The upper end of the lever 39 will be notched as at 41 to receive one end of a tensioning coil spring 42, whose opposite end is secured to the adjusting screw 43 extending loosely through the bracket 44 secured to the top of the saw frame 5 by means of the rivets 45, or in any other desired manner, while a threaded nut 46 is adapted to engage the screw 43 to selectively and variably tension the spring 42 to place the desired tension on the saw blade.

The auxiliary handle 47 will be supported upon the upper edge of the saw frame 5 and may be swivelly mounted if desired, whereby one hand will grasp the handle 1 and the handle 47 will be grasped by the other hand when removing the saw from its support, and when using same as a portable tool.

From the foregoing description, it will be apparent that there has been provided a highly efficient form of power operated saw which will include an inverted U-shaped frame and handle attached thereto, together with a saw blade reciprocably mounted between the ends of said frame, and a variable speed operating means for causing the reciprocating movement of said saw blade.

While the preferred embodiment of the instant invention has been illustrated and described, it will be understood that it is not intended to limit the scope of the invention thereto, as many minor changes in detail of construction may be resorted to without departure from the spirit of the invention.

Having thus described our invention what we claim as new and desire to secure by Letters Patent of the United States is:

A power operated saw comprising an inverted U-shaped frame having a handle at one of its leg portions, an elongated blade secured between the leg portions of said frame, gear means carried by said frame interconnecting one end of said blade with a power means for reciprocating said blade, a pair of spaced plates secured to the other leg portion of said frame, bracket means pivotally securing said plates to a support, a bell crank lever pivoted intermediate its ends between said plates, means securing one end of said lever to the other end of said blade, an apertured bracket secured to the web portion of said frame, a screw extending through said apertured bracket, a coil spring interconnecting the other end of said lever with said screw, and an adjusting nut carried by said screw.

FRANK GAVIOLA.
FRANK ANACABE.

REFERENCES CITED

The following references are of record in the file of this patent:

UNITED STATES PATENTS

| Number | Name | Date |
|---|---|---|
| 1,545,454 | Powell | July 7, 1925 |
| 1,845,731 | Stoddard | Feb. 16, 1932 |
| 2,206,614 | O'Hern | July 2, 1940 |
| 2,208,843 | Hedgpeth | July 23, 1940 |
| 2,330,618 | Plumb | Sept. 28, 1943 |
| 2,337,769 | Redenbo | Dec. 28, 1943 |